UNITED STATES PATENT OFFICE.

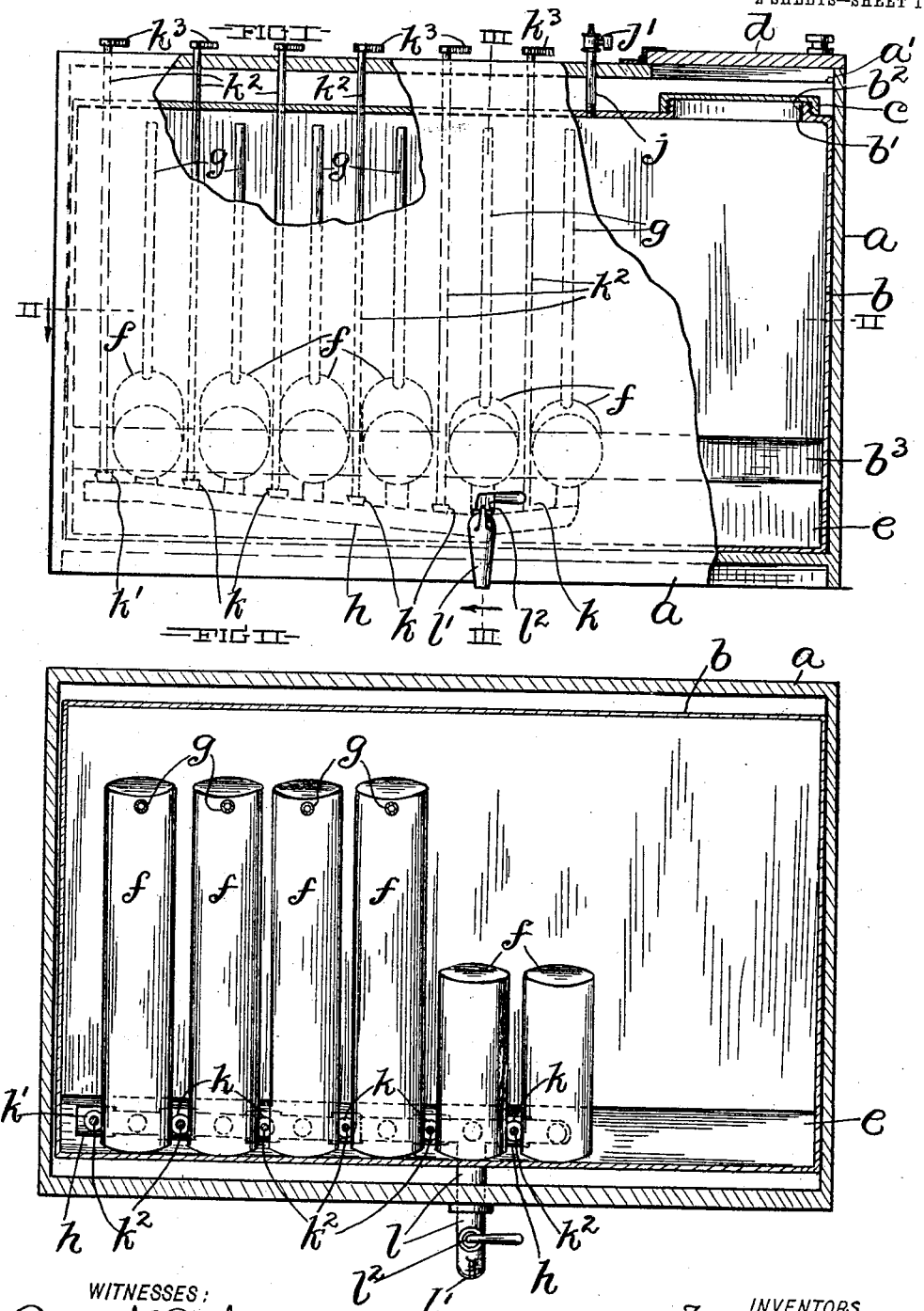

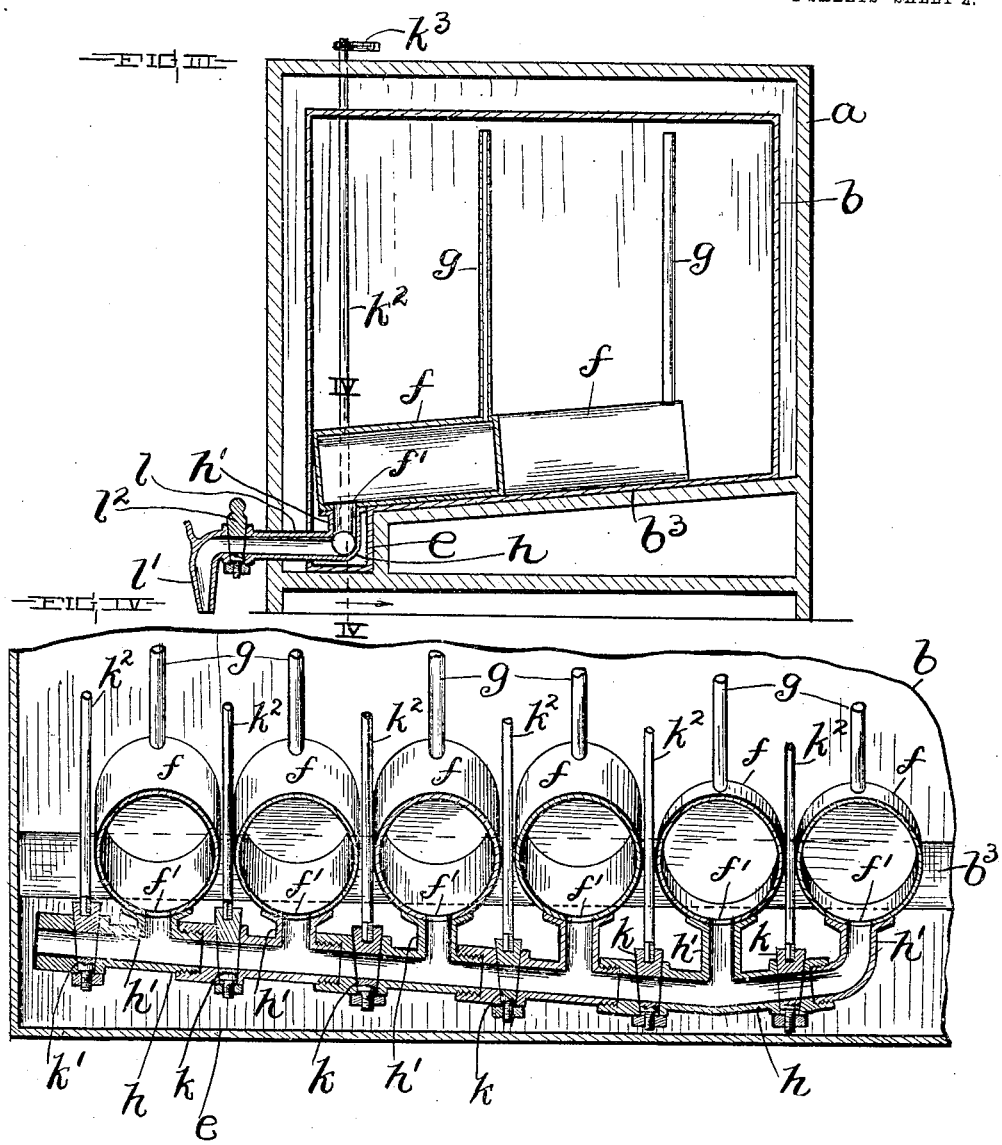

FRANK S. TURNER, SUMNER PEASE, AND WARD B. MARTIN, OF GENEVA, OHIO, ASSIGNORS, BY MESNE ASSIGNMENTS, TO W. B. MARTIN.

LIQUID-MEASURING DEVICE.

No. 809,273.     Specification of Letters Patent.     Patented Jan. 2, 1906.

Application filed July 12, 1902. Serial No. 115,282.

*To all whom it may concern:*

Be it known that we, FRANK S. TURNER, SUMNER PEASE, and WARD B. MARTIN, citizens of the United States of America, and residents of Geneva, in the county of Ashtabula and State of Ohio, have invented certain new and useful Improvements in Liquid-Measuring Devices; and we do hereby declare the following to be a full, clear, and exact description of the invention, such as will enable others skilled in the art to which it pertains to make and use the same.

Our invention relates to improvements in liquid-measuring devices more especially designed for measuring oil and adapted to rapidly deliver a certain predetermined quantity without requiring accurate attention of the attendant.

The object of this invention is more especially to improve upon the measuring device disclosed in United States Letters Patent No. 675,290, granted May 28, 1901.

With this object in view and to render the device cleanly and convenient and reliable in its operation our invention consists in certain features of construction and combinations of parts hereinafter described, and pointed out in the claims.

In the accompanying drawings, Figure I is a front side elevation, largely in section, of a measuring device embodying our invention. Fig. II is a top plan in horizontal section on line II II, Fig. I. Fig. III is a right-hand side elevation in section on line III III, Fig. I. Fig. IV is a front side elevation in section on line IV IV, Fig. III, of a portion of the device. Fig. IV is drawn on a larger scale than the preceding figures.

Our improved measuring device is contained in the main within a case or cabinet $a$ and comprises a metal tank or reservoir $b$ for containing the body of oil or liquid (not shown) from which a predetermined quantity is drainable at a time. The reservoir $b$ is provided at the top with an inlet-forming liquid-receiving aperture $b'$, which is flanged upwardly and annularly, as at $b^2$. The flange $b^2$ is screw-threaded externally and embraced by a correspondingly internally threaded cap $c$, which closes the said inlet. The reservoir $b$ is supplied with liquid at the inlet $b'$ upon the removal of the cap $c$, to which access is had through an opening $a'$, formed in the top of the case $a$, which opening is normally closed by a suitably-applied lid or cover $d$.

The bottom $b^3$ of the chamber of the reservoir $b$ declines forwardly and is depressed next to the front of the said reservoir, so as to form a trough $e$, which is arranged in a horizontal plane along the said front and forms a downward enlargement of the said chamber next rearward of the said front. Upon the bottom $b^3$ is a row of closed parallel measuring vessels $f$, arranged a short distance apart laterally. The vessels $f$ are preferably metallic and cylindrical, resting upon the aforesaid bottom, and consequently declining forwardly and extend over and transversely of the trough $e$ and preferably abut at their forward ends against the inner side of the front of the reservoir $b$. The illustrated measuring device has six vessels $f$. Each vessel $f$ is provided at the top and near the rear end with a vent-pipe $g$, which extends upwardly into close proximity to the top of the reservoir $b$, which is provided in the top thereof with a vent-pipe $j$, which (see Fig. I,) projects upwardly through the top of the case $a$ and is provided above the said case with a normally closed valve $j'$. Within the trough $e$ is arranged a pipe $h$, which extends longitudinally of the said trough below the forward and lower ends of the vessels $f$. The pipe $h$ extends a suitable distance beyond the left-hand end of the row of vessels $f$ and is open at its left-hand end and there communicates with the interior of the trough $e$, and consequently with the chamber of the reservoir $b$. The pipe $h$ is provided at the top with as many upwardly-projecting tubular members $h'$ as there are vessels $f$, and one of the said members $h'$ forms the right-hand end of the said pipe. The different members $h'$ are in open relation at their upper end with the chamber of the different vessels $f$, respectively, and communicate at their lower end with the passage-way formed by and interiorly and longitudinally of the pipe $h$. Preferably each vessel $f$ is soldered or otherwise attached to the pipe member $h'$ with which the said vessel communicates, and the bottom of the said vessel at the forward end of the vessel and next over the said member $h'$ is apertured or perforated, as at $f'$, so as to establish communication between the said member $h'$ and the chamber of the said vessel.

The pipe $h$ is provided between adjacent vessels $f$ with a normally open valve $k$, adapted to control continuity in the passage-way formed by and within the said pipe, which valve is arranged preferably centrally between the pipe members $h'$, which communicate with the said vessels. The pipe $h$ is provided also at the left-hand or outer side of the outermost vessel $f$ at the left-hand end of the row of vessels $f$ with a normally open valve $k'$. The valves $k$ and $k'$ are provided, respectively, with a stem $k^2$, which extends outside of the reservoir $b$ and outside of the case or cabinet $a$ and is provided outside of the said case with a handle $k^3$ for manipulating the connected valve.

The pipe $h$ is provided at the lower end of its member $h'$, which connects with the second outermost vessel $f$ at the right-hand end of the row of vessels $f$, with a forwardly-projecting branch or discharge pipe $l$, which extends through the front of the case $a$ and is provided outside of the said case with a downwardly-discharging spout $l'$ and a normally closed valve $l^2$ for controlling continuity in the passage-way formed by the said branch.

By the construction hereinbefore described it will be observed that the measuring vessels $f$ and the connected pipe $h$ are submerged when the reservoir $b$ is supplied or filled with oil; that in filling the said reservoir oil passes into the trough $e$, thence into the pipe $h$ at the open end of the said pipe, and thence into the vessels $f$, and that the arrangement of the vent-pipes $g$ entirely within the reservoir $b$ reduces the escape of oil-vapor from the reservoir $b$ to a minimum. Of course fluid-tight joints are provided wherever necessary; but the formation of such joints is too well understood to require illustration and description in this application.

The outermost vessel $f$ and the next outermost vessel $f$ at the right-hand end of the row of vessels $f$ are smaller than the remaining vessels $f$, and suppose that a drainage of each of the said smaller vessels will yield a half-gallon and that a drainage of each of the larger vessels will yield one gallon. Obviously then only the inner smaller vessel $f$ or a half-gallon would upon opening the valve $l^2$ after closing the valves $k$ between the said vessel and the adjacent vessels $f$ be drained through the discharge-pipe $l$; that upon opening the valve $l^2$ after closing only the valve $k$ between the inner smaller vessel $f$ and the next adjacent larger vessel $f$ both smaller vessels $f$, or one gallon, are drained through the pipe $l$, and obviously one and one-half gallons, two gallons, two and one-half gallons, three gallons, three and one-half gallons, four gallons, four and one-half gallons, or five gallons can be drained upon opening the valve $l^2$ after closing the required valve or valves $k$, and that the valve $k'$ at the outer side of the outermost larger vessel $f$ at the left-hand end of the row of vessels $f$ must be closed preparatory to draining the said outermost vessel.

It is obvious that by the pipe $h$ and its members $h'$ a passage-way is formed between each measuring vessel $f$ and the discharge-pipe $l$; that the location of the said vessels and connected pipe $h$ within the reservoir $b$ renders the device cleanly, convenient, and compact; that the trough $e$ forms a downward extension of the forward portion of the interior chamber of the oil-supply reservoir, and that the said chamber and its said extension downwardly into the said trough constitutes the liquid-receiving interior space of the said reservoir, and we would have it understood that our invention broadly embraces the combination, with any liquid-supply reservoir, of a row of measuring vessels arranged with the liquid-receiving interior space of the reservoir at suitable intervals widthwise of the reservoir, a discharge-pipe arranged to discharge externally of the reservoir, and the passage-ways formed by the pipe $h$ and its members $h'$ and valves, whereby one or more of the said vessels can be drained at a time through the said discharge-pipe without moving or interfering with the contents of the remaining vessel or vessels, with the said valves and passage-ways contained within the aforesaid liquid-receiving space of the reservoir, so that any oil or liquid leaking from the said passage-ways and valves does not run onto the floor upon which our improved measuring-cabinet is placed. We would remark also that the arrangement of the measuring vessels in a row widthwise of the reservoir, with the bottoms of the vessels declining toward the front of the cabinet, with the outlets of the said vessels at the lower ends of the said bottoms, and with the pipe $h$ declining from both ends toward the discharge-pipe $l$, perfect drainage of any vessel or vessels which are to be drained is insured. It will be observed also that the pipe $h$ declines toward the discharge-pipe $l$ from both ends of the said pipe $h$, so that oil or liquid is rapidly conducted to the said discharge-pipe.

What we claim is—

1. In a liquid-measuring device, the combination, with a liquid-supply reservoir, of a pipe communicating at one end with the liquid-receiving interior space of the reservoir, and contained within the reservoir, which pipe is provided with a valved discharge branch between the ends of the pipe and declines toward its said branch from both ends; a row of measuring vessels contained within the reservoir along the pipe and communicating with the passage-way formed by and interiorly of the said pipe, and the valves arranged to control continuity in the said passage-way, substantially as and for the purpose set forth.

2. In a liquid-measuring device, the combination, with a liquid-supply reservoir, of a pipe arranged within the liquid-receiving interior space at the bottom and forward side of the reservoir and communicating at one end with the said space, which pipe is provided with a valved discharge branch between the ends of the pipe, and declines toward its said branch from both ends; a row of measuring vessels contained within the reservoir along the aforesaid pipe and having bottoms declining toward the pipe, which vessels communicate at the lower end of the said bottoms with the passage-way formed by and interiorly of the said pipe, and the valves arranged to control continuity in the said passage-way, substantially as and for the purpose set forth.

3. In a liquid-measuring device, the combination, with a liquid-supply reservoir of a row of vented measuring vessels within the lower portion of the reservoir, which row is arranged widthwise of the reservoir; a pipe arranged at the bottom and longitudinally of the row of measuring vessels and provided with a valved discharge branch extending outside of the reservoir, which pipe is contained within the liquid-receiving interior space of the reservoir and communicates with the interior chambers of the aforesaid vessels, and normally open valves arranged to control continuity in the passage-way formed by and within the said pipe, substantially as and for the purpose set forth.

4. In a liquid-measuring device, the combination, with a liquid-supply reservoir, of a row of vented measuring vessels contained within the lower portion of the liquid-receiving interior space of the reservoir, which vessels have their bottoms declining toward the front of the reservoir and have outlets at the lower ends of the said bottom; a pipe arranged within the liquid-receiving interior space of the reservoir and extending longitudinally of the aforesaid row of vessels, which pipe is provided with a valved discharge branch extending outside of the said space and communicates with the aforesaid outlets, normally open valves arranged to control continuity in the passage-way formed by and within the said pipe and arranged as required to render any one or more of the aforesaid vessels drainable through the said pipe and the connected branch without moving or interfering with the contents of the remaining vessel or vessels, and means for manipulating the said valves from the exterior of the reservoir.

5. In a liquid-measuring device, the combination, with a liquid-supply reservoir having a declining bottom and a trough arranged at the lower end of the said bottom and in open relation with the chamber of the reservoir, of a plurality of vented measuring vessels arranged over the said bottom and contained within the chamber of the reservoir, a pipe arranged within and longitudinally of the said trough and provided with a valved discharge branch extending outside of the said trough, which pipe is in open relation with the chambers of the said vessels, the said normally open valves arranged to control continuity in the passage-ways formed by and within the said pipe, substantially as and for the purpose set forth.

6. In a liquid-measuring device, the combination, with a liquid-supply reservoir having a declining bottom and a trough arranged at the lower end of the said bottom and in open relation with the chamber of the reservoir, of a row of vented measuring vessels arranged over the said bottom and contained within the chamber of the reservoir; a pipe arranged within and longitudinally of the said trough and provided with a valved discharge branch which extends outside of the said trough and having upwardly-projecting tubular members which connect at their lower ends with the passage-way formed within and extending longitudinally of the said pipe and communicate, at the upper end, with the chamber of the different measuring vessels, respectively, which pipe has one of the said upwardly-projecting members forming one end of the said pipe and is open at its opposite end; normally open valves arranged to control continuity in the aforesaid passage-way between the measuring vessels, and another normally open valve arranged to control continuity in the said passage-way between the open extremity of the pipe and the adjacent side of the adjacent measuring vessel.

Signed by us at Geneva, Ohio, this 24th day of June, 1902.

FRANK S. TURNER.
SUMNER PEASE.
WARD B. MARTIN.

Witnesses:
A. B. MARTIN,
N. E. KAY.